March 21, 1961 L. D. FIELD 2,975,524
ANGLE MEASURING DEVICE
Filed May 20, 1957
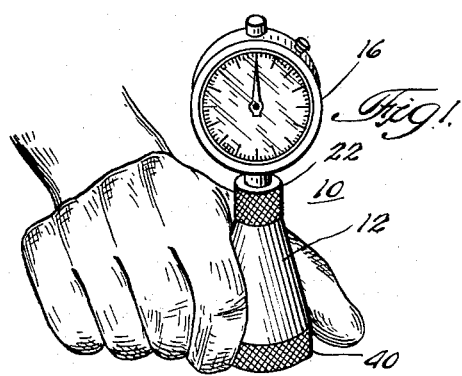
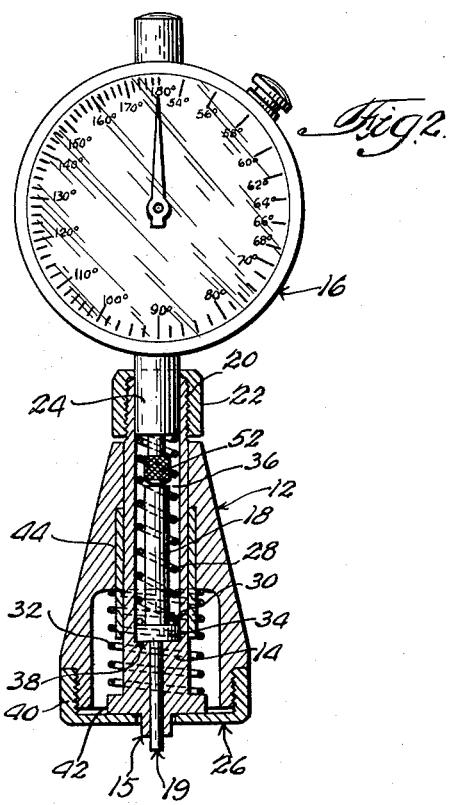
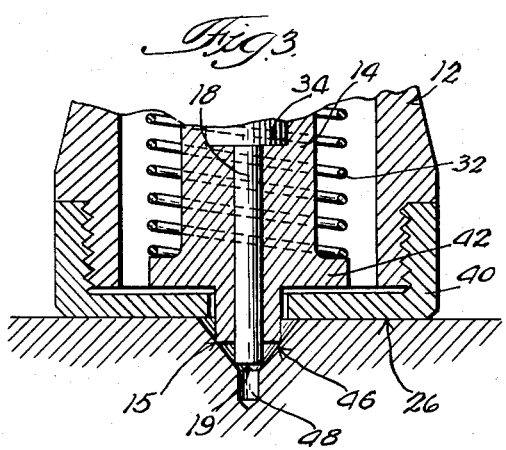
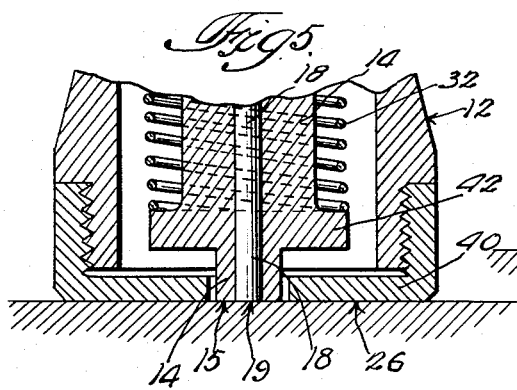
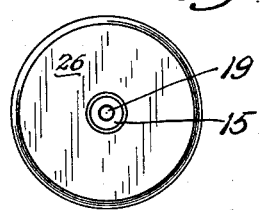
INVENTOR.
Leonard D. Field.
BY
Olson, Mecklenburger, van Holst,
Pendleton, & Neuman United States Patent Office 2,975,524
Patented Mar. 21, 1961

2,975,524
ANGLE MEASURING DEVICE
Leonard D. Field, 5448 W. Adams St., Chicago, Ill.
Filed May 20, 1957, Ser. No. 660,404
5 Claims. (Cl. 33—174)

This invention relates to an improved apparatus for measuring angles and more particularly to an improved hand-manipulated gauge for indicating the included angle of any conic section, such as the countersunk portion of a tapped aperture or recess for receiving any flat head or flush type screw, rivet or other connector.

In industry it is frequently necessary to provide a countersunk area surrounding the circumference of apertures or cavities which are subsequently threaded to receive machine screws. In this particular invention reference is made to the type of countersink which is frusto-conical in cross section and adapted to receive machine screws having a tapered head portion extending from the crown of the screw head inwardly to the shank. As is readily understood it is necessary or advisable in conventional machine shop operations to check these countersink holes for proper angle or slant prior to assembly of the finished object.

A gauge for the measurement of countersink angles must, for optimum versatility, provide for the direct dial reading of countersink-angles without the necessity of any calculations on the part of the user. It is also desirable and necessary to insure that the gauge device be maintained in perpendicular relation to the surface wherein the countersink is located to minimize errors from improper application of the measuring device. Since it is often necessary to measure countersink-angles of varying apertures or diameters it would be a valuable attribute of such a gauge if a number of gauge bodies of varying sizes were interchangeable and could be utilized with a single dial indicator. In connection with this interchangeable feature and for other obvious reasons a gauge of this nature should be readily calibrated by simple and rapid means.

Accordingly, it is an important object of the present invention to provide an angle measuring device for the rapid and accurate measurement of various angles.

It is another object of this invention to provide an improved countersink-angle measuring device which is maintained perpendicular to the surface of the object being measured to thereby secure more accurate readings.

A still further object is the provision of a countersink-angle measuring device which gives direct readings of the countersink angle.

A still further object is the provision of a countersink-angle measuring gauge which is interchangeable with respect to the gauge bodies.

A still further object is the provision of a countersink-angle measuring device which is readily calibrated.

A still further object is the provision of a countersink-angle measuring device wherein the indicator mechanism is protected from shock during measuring operations.

Further and additional objects of this invention will become apparent from the following specification, accompanying drawings and the appended claims.

In one form of this invention a countersink-angle measuring device is provided comprising a housing having a planar reference surface at one end thereof and a sleeve slidably mounted in said housing perpendicular to the reference surface adapted for motion between an extended and retracted position relative to said housing. A plunger is also provided slidably mounted in said sleeve for motion between an extended and retracted position relative to said sleeve. A dial-type indicator is mounted at one end of said sleeve to register the position of the plunger relative to the sleeve. The sleeve and plunger are spring balanced by independent resilient means disposed about each of said members, said resilient means urging the sleeve and plunger to the respective extended positions.

For a more complete understanding of this invention reference will now be made to the accompanying drawings, wherein:

Figure 1 is a perspective view on a reduced scale of one embodiment of this invention in use;

Fig. 2 is a front elevational view of the embodiment of Fig. 1 partially in section;

Fig. 3 is an enlarged fragmentary sectional view of the gauge of Fig. 2 in measuring position;

Fig. 4 is a bottom plan view of the housing sleeve and plunger of the embodiment of this invention illustrated in Fig. 2;

Fig. 5 is an enlarged fragmentary sectional view similar to Fig. 3 showing the sleeve and plunger in gauge calibrating position; and Fig. 6 is a sectional view of a screw aperture and countersink hole illustrating the included angle measured by the apparatus of this invention.

Referring now to the drawings and in particular to Figs. 1 and 2, a gauge 10 is illustrated comprising generally a tubular housing 12 and dial indicator 16. A cylindrical sleeve 14 has one end extending from one end of the housing to form a gauge end 15 and a dial indicator 16 mounted at the other end thereof. Said other end of the sleeve 14 is provided with external threads 20 thereon and slotted to form a collet. An internally threaded collet nut 22 is adapted to fit over the threaded end of the sleeve so as to constrict the internal diameter of the sleeve at the threaded end to provide a snug fit around a neck portion 24 of the indicator 16.

The housing 12 has a planar surface 26 at one end thereof apertured to admit the gauge end 15 of the sleeve 14. In the embodiment of Fig. 2 the housing is shown as a two piece construction with a separate apertured cap 40. A plunger 18 is slidably mounted within the sleeve 14 adapted for reciprocal motion therein and shown in the extended position. The plunger has a flat gauge surface 19 at one end thereof. The plunger 18 is provided with an intermediately disposed annular flange 34 or stop means having on the one surface thereof a spring receiving facing 30, said stop means 34 limiting the extension of the plunger 18 from the sleeve 14.

The sleeve 14 is generally cylindrical in shape and has an interior cavity 36 with a partial constriction 38 at one end thereof to form an abutment against which the flange 34 rests when the plunger 18 is in the extended position. The sleeve 14 has a similar annular flange or stop means 42 adjacent one end thereof limiting the extension of the sleeve 14 from the housing 12. A tubular bushing 44 is mounted within the housing 12 to receive said sleeve and provide a tight sliding fit for the sleeve 14. Spring means 28 is disposed about the plunger 18 and normally compressed between the neck 24 of the gauge 16 and a facing 30 on said plunger, said spring urging the plunger to the extended position with respect to said sleeve 14. Similar spring means 32 is disposed about the sleeve 14 and compressed between the shoulder 42 and the housing 12 urging the sleeve to extend from the housing 12 beyond the planar surface 26 thereof until flange 42 abuts the end cap 40.

Referring now to Figs. 2 and 3, in operation the gauge is placed over the countersunk hole whereupon the spring means 28 and 32 urge, respectively, the plunger 18 and the sleeve 14 to the extended position beyond the planar surface 26 of the housing and engaging the annular countersink surface 46 disposed at an angle to the axis of a screw cavity 48. The extension of the plunger 18 relative to the sleeve 14 is registered on the dial indicator 16, which converts the linear movement of the plunger 18 to curvilinear motion, moving the dial indicator needle over a portion of the circumference of the dial face.

It is contemplated that the sleeve member has a known wall thickness at the end 15 and is integrally connected with the neck 24 of the dial indicator 16 by means of pressure exerted by the collet nut 22. The movement of the plunger 18 with reference to the sleeve is transmitted to the dial indicator 16 by abutment of plunger 18 against a pin 52 extending from the neck 24 and communicating with the dial indicator mechanism. The angle between the axis of the plunger and the countersink surface 46 is measured by determining the tangent of that angle, in the described embodiment of the invention. With reference to this particular measuring device, the angle is determined by the measured ratio of the wall thickness of said sleeve to the extension of the plunger. This ratio is, of course, the tangent of the above described angle. The face of the dial is calibrated to give a direct angular reading. In Fig. 3 the sleeve and plunger are shown in angle measuring position, being partially extended and abutting against the angular surface of the countersunk hole.

In Fig. 5 the relative positions of the plunger and sleeve in gauge calibrating positions are illustrated. The gauge may be calibrated in this particular embodiment by placing the gauge against a flat surface, whereby the surfaces of the cap 40, sleeve 14 and plunger 18 align, and adjusting the face of the dial indicator, which is rotatable independently of the housing and indicator needle, to indicate 180°. Generally, it is preferred that in the various embodiments of this invention gauge bodies having sleeves of a fixed wall thickness be provided utilizing this wall thickness as a fixed or standard dimension. Several diameters of sleeves and plunger may be provided which are specifically adapted for the measurement of various sizes of countersink holes. For practical purposes the plunger should be at least 0.075 inch in diameter and the dial indicator should be selected so that one-tenth of an inch linear motion of the plunger has a movement on the dial of about 360°. In one particular embodiment of this invention, a plunger was provided having a diameter of 0.100 inch slidably reciprocable in a sleeve having a wall thickness of 0.050 inch and an outer circumference of 0.200 inch. A 0.1 inch travel of the plunger produced one revolution on the dial indicator. Thus the minimum value of the tangent will be $$\frac{0.050}{0.100} = \frac{1}{2}$$

and the minimum angle measurable with this embodiment would be about 26° 34'.

As is readily understandable, for the various diameters of threaded apertures and their corresponding countersunk portions, it is desirable to utilize gauges having pin and sleeve diameters which are particularly adapted for the size of aperture being measured. As was previously mentioned, various housings may be prepared having as a standardized portion thereof the wall thickness of the sleeve and varying only in the diameter of the plunger, and the sleeve which is adapted to that particular plunger. It is therefore possible, using a single dial indicator, to use several body portions therewith which interchange necessitates simple calibration by placing the gauge on a flat surface (see Fig. 5) and setting the dial face to bring the 180° mark opposite the needle indicator. The dial is preferably calibrated to show the included angle of the countersunk hole, which is twice the value of the acute angle made by the intersection of the axis of the plunger 18 and the surface of the countersink 46, described above. This included angle is shown in Fig. 6 as the angle theta ($\theta$).

As may be seen from the foregoing, the countersink-angle measuring device of the present invention is readily adapted for quick and accurate measurements of countersink angles. In use, the planar surface 26 of the housing is in normal or perpendicular relationship to the concentric sleeve and plunger, thus insuring accurate angular measurements in that the plunger and sleeve are always in line with the axis of the threaded aperture and normal to the surface of the object wherein the threaded aperture is located. It is also readily apparent that the dial indicator mechanism is protected from injury or shock when abruptly applied to the work to be measured, in that the sleeve and plunger assembly are moved as a unit with reference to the housing and that the only motion which is registered upon the dial indicator is the relative motion of the plunger and sleeve. While various shapes are contemplated in several embodiments of this invention, it is preferred that the sleeve and plunger be of a cylindrical shape and that the measurement or gauging surfaces thereof be at substantial right angles to their respective axes so that in both calibration and measurement the same surfaces are used.

While one particular embodiment of the present invention has been herein illustrated, it is clear that others may, by applying current knowledge, adapt the same under varying conditions of service and while retaining certain features which may properly be said to constitute the ideas of novelty involved which I hereinafter claim, may modify and adapt the invention herein taught to other uses.

I claim:

1. An angle measuring device comprising a tubular housing adapted for hand manipulation and having means defining a planar reference surface at one end thereof, a sleeve having a forward end of accurately predetermined outer diameter mounted in said housing for motion along an axis substantially normal to said planar surface between an extended position wherein said forward end extends from said surface and a retracted position at which said forward end is in the plane of said surface, stop means to limit the extension of said sleeve relative to said surface, a plunger having a forward end of accurately predetermined outer diameter mounted coaxially in and cooperatively engaged with said sleeve reciprocable between an extended position wherein said forward end extends forwardly of said sleeve and a retracted position with the forward end in the plane of said surface, stop means to limit the extension of said plunger, an indicator mounted at the other end of said sleeve to register the position of said plunger relative to said sleeve, and independent resilient means disposed about and urging said sleeve and said plunger to the extended positions, said indicator being calibrated corresponding to a ratio of the extension of said plunger relative to said sleeve and the differences between the outer diameter of said forward end of the sleeve and the outer diameter of said forward end of the plunger.

2. The device of claim 1 wherein said plunger and said sleeve are removable and replaceable and said indicator is adjustable to varying diameters of plungers and sleeves adapted to each particular plunger by one 180° alignment of plunger, sleeve and said planar reference surface.

3. The device of claim 1 wherein the plunger and sleeve are cylindrical sliding members.

4. The device of claim 1 wherein the indicator is removably mounted on said sleeve.

5. The device of claim 1 wherein the indicator is a dial indicator calibrated in angular measurements expressing the angle between the axis of the plunger and a line connecting corresponding points on the forward ends of the plunger and the sleeve.

References Cited in the file of this patent

UNITED STATES PATENTS

| | | |
|---|---|---|
| 2,175,650 | Schaber | Oct. 10, 1939 |
| 2,492,369 | Robins | Dec. 27, 1949 |
| 2,622,336 | Raout | Dec. 23, 1952 |
| 2,642,670 | Dow | June 23, 1953 |
| 2,650,435 | Kidd | Sept. 1, 1953 |
| 2,758,383 | Breit | Aug. 14, 1956 |
| 2,781,585 | Stalhandske | Feb. 19, 1957 |
| 2,788,582 | Middler | Apr. 16, 1957 |

OTHER REFERENCES

American Machinist, page 150, Sept. 28, 1953.